United States Patent
Xiang

(10) Patent No.: US 9,417,107 B2
(45) Date of Patent: Aug. 16, 2016

(54) MULTI-SENSOR CONTROL CIRCUIT AND METHOD FOR USING THE SAME

(71) Applicant: Zhiyong Xiang, Guangdong (CN)

(72) Inventor: Zhiyong Xiang, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 442 days.

(21) Appl. No.: 14/067,578

(22) Filed: Oct. 30, 2013

(65) Prior Publication Data

US 2015/0082859 A1 Mar. 26, 2015

(30) Foreign Application Priority Data

Sep. 25, 2013 (CN) ...................... 2013 2 0595571 U

(51) Int. Cl.
*A24F 47/00* (2006.01)
*G01F 1/00* (2006.01)
*G01F 25/00* (2006.01)

(52) U.S. Cl.
CPC ................ *G01F 1/00* (2013.01); *A24F 47/008* (2013.01); *G01F 25/0007* (2013.01)

(58) Field of Classification Search
None
See application file for complete search history.

(56) References Cited

U.S. PATENT DOCUMENTS

| | | | | |
|---|---|---|---|---|
| 5,449,956 | A * | 9/1995 | Williams | 307/10.1 |
| 2012/0118301 | A1* | 5/2012 | Montaser | 131/273 |
| 2013/0298905 | A1* | 11/2013 | Levin et al. | 128/202.21 |
| 2014/0096782 | A1* | 4/2014 | Ampolini et al. | 131/328 |
| 2015/0020833 | A1* | 1/2015 | Conley et al. | 131/329 |

FOREIGN PATENT DOCUMENTS

CN 201239027 * 5/2009

* cited by examiner

*Primary Examiner* — Robert R Raevis
(74) *Attorney, Agent, or Firm* — Tim Tingkang Xia, Esq.; Locke Lord LLP

(57) ABSTRACT

A multi-sensor control circuit used in an electronic cigarette comprises a control module, at least two inhalation sensors, and at least two unidirectional circuits corresponding to the inhalation sensors. An output terminal of each inhalation sensor is connected to an input terminal of a corresponding unidirectional circuit, and output terminals of the unidirectional circuits are all connected to a same input pin of the control module. Each inhalation sensor outputs a sensing voltage signal to the corresponding one of the unidirectional circuits upon sensing airflow. Each unidirectional circuit filters the sensing voltage signal received from a corresponding inhalation sensor to generate a unidirectional voltage signal, and outputs the unidirectional voltage signal to the input pin of the control module. The control module controls the electronic cigarette to work upon receiving the unidirectional voltage signal outputted from any unidirectional circuit.

15 Claims, 4 Drawing Sheets

MULTI-SENSOR CONTROL CIRCUIT AND METHOD FOR USING THE SAME

CROSS-REFERENCE TO RELATED APPLICATIONS

This non-provisional application claims priority under 35 U.S.C. §119(a) on Patent Application No. 201320595571.5, filed in P.R. China on Sep. 25, 2013, the entire contents of which are hereby incorporated by reference.

FIELD OF THE INVENTION

The present application relates to the field of daily electronic products, and more particularly, relates to a multi-sensor control circuit and a method for using the same.

BACKGROUND OF THE INVENTION

Sensors of electronic cigarettes may be often soaked by tobacco tar. The tobacco tar may cause the sensors to malfunction, and the electronic cigarettes may be unable to work due to the malfunctions of the sensors.

Aiming at the aforementioned problem, a method for using a plurality of smoking sensors in one electronic cigarette has been provided. Referring to FIG. 1, a structural schematic view of a multi-sensor control circuit in the prior art is shown. The multi-sensor control circuit is used in an electronic cigarette using a plurality of smoking sensors (e.g., inhalation sensors), and includes a control module. The control module includes a microcontroller, and the microcontroller has a plurality of input pins. Output terminals of the plurality of smoking sensors are respectively connected to different input pins of the microcontroller, and the software installed in the microcontroller deals with the input signals from the different input pins as logical OR circuit. When any one of the smoking sensors malfunctions, the other smoking sensors can act as the backup of the malfunctioning smoking sensor. However, the connection method of the multi-sensor control circuit requires occupying more I/O interfaces or pins of the microcontroller, and therefore the hardware cost may increase. Furthermore, controlling the smoking sensors occupies much software resource of the microcontroller.

Therefore, the prior art has drawbacks and needs to be improved.

SUMMARY OF THE INVENTION

The present application is configured to solve this technical problem: aiming at the defect in the prior art that an electronic cigarette using only one smoking sensor is prone to malfunction and an electronic cigarette using a plurality of smoking sensors may require complicated hardware and much software resource, a multi-sensor control circuit is provided.

A technical solution of the present application configured to solve the aforementioned technical problem is that: a multi-sensor control circuit is provided.

In one aspect, the multi-sensor control circuit used in an electronic cigarette comprises a battery, a control module, at least two inhalation sensors, and at least two unidirectional circuits corresponding to the inhalation sensors; an output terminal of each of the inhalation sensors is connected to an input terminal of a corresponding one of the unidirectional circuits, and output terminals of the unidirectional circuits are all connected to a same input pin of the control module; the battery is connected to the control module and each of the inhalation sensors;

In the aspect, each of the inhalation sensors is configured to output a sensing voltage signal to corresponding one of the unidirectional circuits when the inhalation sensor senses airflow; each of the unidirectional circuits is configured to filter the sensing voltage signal received from corresponding one of the inhalation sensors to generate a unidirectional voltage signal, and output the unidirectional voltage signal to the input pin of the control module;

In the aspect, the control module is configured to control the electronic cigarette to work upon receiving one or more of the unidirectional voltage signals outputted from one or more of the unidirectional circuits.

In one embodiment, each of the unidirectional circuits includes a diode, and the multi-sensor control circuit further includes a pull-down resistor; an anode of the diode of each of the unidirectional circuits is connected to one of the inhalation sensors corresponding to the unidirectional circuit, and a cathode of the diode of each of the unidirectional circuits is connected to one end of the pull-down resistor and the input pin of the control module; the other end of the pull-down resistor is grounded. The diode of each of the unidirectional circuits is a Schottky diode. The type of all of the inhalation sensors is S087.

In another embodiment, each of the unidirectional circuit further includes a diode, and the multi-sensor control circuit further includes a pull-up resistor; a cathode of the diode of each of the unidirectional circuits is connected to one of the inhalation sensors corresponding to the unidirectional circuit, and an anode of the diode of each of the unidirectional circuits is connected to one end of the pull-up resistor and the input pin of the control module; the other end of the pull-up resistor is connected to a positive pole of the battery.

In the aspect, each of the inhalation sensors includes a first sensor pin, a second sensor pin, and a third sensor pin; the first sensor pin is connected to a positive pole of the battery, the second sensor pin is connected to the input pin of the control module via the unidirectional circuit corresponding to the inhalation sensor, and the third sensor pin is grounded.

The control module includes a microprocessor; the type of the microprocessor is SN8P2711B, and a second pin of the microprocessor acts as the input pin of the control module.

In the aspect, the multi-sensor control circuit further includes a switch module and an atomizer module; the atomizer module is connected to the battery via the switch module, and the switch module is further connected to the control module. The switch module is configured to be turned on under control of the control module when the control module receives the unidirectional voltage signal outputted from any one of the unidirectional circuits, and thereby the switch module electrically connects the atomizer module to the battery. The atomizer module is configured to perform atomizing work when the switch module electrically connects the atomizer module to the battery. The switch module includes a MOS transistor and a bias resistor; the gate of the MOS transistor is connected to the control module, the source of the MOS transistor is grounded, the drain of the MOS transistor is connected to the atomizer module, and the gate of the MOS transistor is further connected to the ground via the bias resistor.

In the aspect, the multi-sensor control circuit further includes an indication module; the indication module is connected to the battery and the control module respectively, and is configured to indicate the case that one or more of the inhalation sensors sense airflow under control of the control module. The indication module includes a light emitting diode.

The present application further provides a method for using a multi-sensor control circuit of an electronic cigarette, and the method comprises these steps:

S1, using each of the inhalation sensors of the multi-sensor control circuit to output a sensing voltage signal to corresponding one of the unidirectional circuits of the multi-sensor control circuit when the inhalation sensor senses airflow;

S2, using each of the unidirectional circuits to filter the sensing voltage signal received from the corresponding inhalation sensor to generate a unidirectional voltage signal, and output the unidirectional voltage signal to an input pin of a control module of the multi-sensor control circuit;

S3, using the control module to control the electronic cigarette to work upon receiving one or more of the unidirectional voltage signals outputted from one or more of the unidirectional circuits;

In the method for using a multi-sensor control circuit of an electronic cigarette of the present application, in the step S3, the process of using the control module to control the electronic cigarette to work includes these sub-steps:

S31, using the control module to turn on a switch module of the multi-sensor control circuit;

S32, using the switch module to electrically connect an atomizer module of the multi-sensor control circuit to a battery of the multi-sensor control circuit, and then using the atomizer module to perform atomizing work.

In the method for using a multi-sensor control circuit of an electronic cigarette of the present application, in the step S3, the process of using the control module to control the electronic cigarette to work further includes this sub-step:

S31', using the control module to control an indication module of the multi-sensor control circuit to indicate the case that one or more of the inhalation sensors sense airflow.

By implementing the multi-sensor control circuit of the present application, the following advantages can be achieved: the multi-sensor control circuit of the present application is used in an electronic cigarette and includes a control module, at least two inhalation sensors, and at least two unidirectional circuits corresponding to the inhalation sensors. A sensing voltage signal outputted from each inhalation sensor is filtered by a corresponding unidirectional circuit and thereby becomes a unidirectional voltage signal. Output terminals of the unidirectional circuits are all connected to a same input pin of the control module. Upon receiving a unidirectional voltage signal outputted from any one of the unidirectional circuits, the control module controls the electronic cigarette to work. In this way, the failure rate of the electronic cigarette can be decreased. Furthermore, the multi-sensor control circuit of the present application neither requires too complicated hardware nor occupies too much software resource.

DETAILED DESCRIPTION OF THE PREFERRED EMBODIMENT

Figure 1:
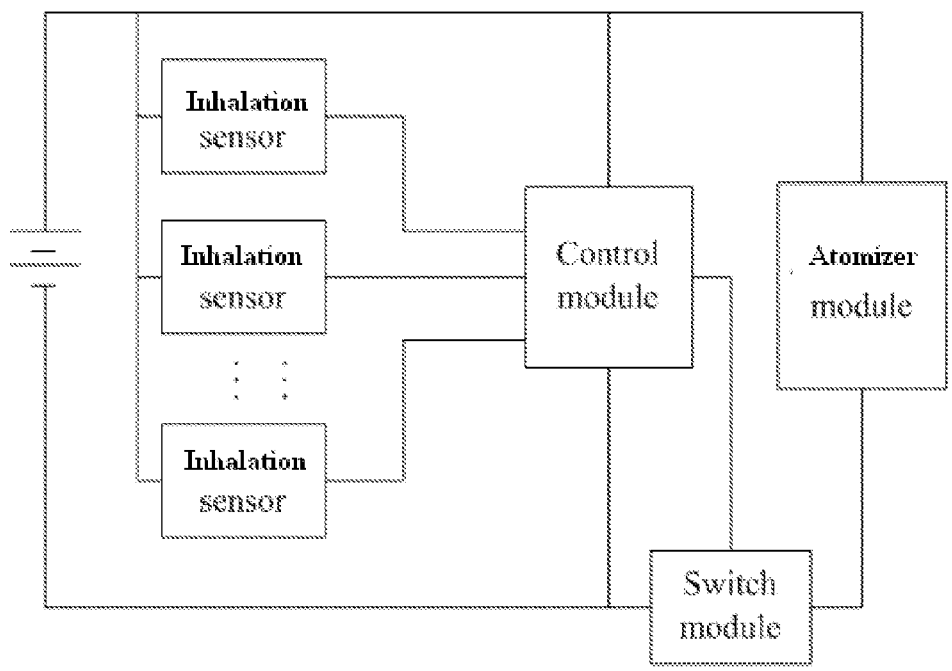
FIG. 1 is a block diagram of a multi-sensor control circuit in the prior art.

In order to understand the technical features, purpose and the effect of the present invention more clearly, the preferred specific embodiments of the present invention will be described referring to the drawings.

For overcoming the defect in the prior art that an electronic cigarette using only one smoking sensor is prone to malfunction and an electronic cigarette using a plurality of smoking sensors may require complicated hardware and much software resource, a multi-sensor control circuit is provided.

Figure 2:
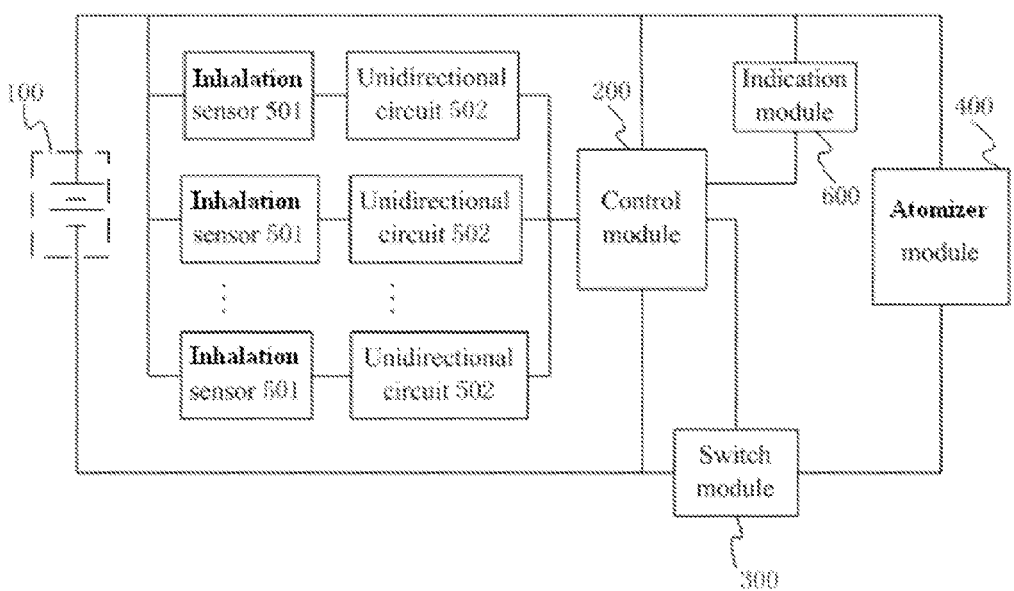
FIG. 2 is a block diagram of a multi-sensor control circuit of the present application.

FIG. 2 is a block diagram of a multi-sensor control circuit of the present application.

As shown in FIG. 2, the multi-sensor control circuit of the present application includes a battery 100, a control module 200, a switch module 300, an atomizer module 400, an indication module 600, at least two inhalation sensors 501, and at least two unidirectional circuits 502 corresponding to the inhalation sensors 501.

The battery 100 is connected to the control module 200, the indication module 600, and each of the inhalation sensors 501. Furthermore, the battery 100 is connected to the atomizer module 400 via the switch module 300. The control module 200 is further connected to the switch module 300 and the indication module 600. An output terminal of each of the inhalation sensors 501 is connected to an input terminal of corresponding one of the unidirectional circuits 502, and output terminals of all of the unidirectional circuits 502 are all connected to a same input pin of the control module 200.

When the multi-sensor control circuit is used in an electronic cigarette, using the plurality of inhalation sensors 501 can effectively decrease a failure rate of the electronic cigarette. Even if one of the inhalation sensors 501 malfunctions, the others of the pneumatic sensors 501 are still capable of sensing airflow. Since the output terminals of the inhalation sensors 501 are all connected to the same input pin of the control module 200 via the unidirectional circuits 502, the multi-sensor control circuit can avoid occupying too much hardware and software resource of the electronic cigarette.

The battery 100 is configured to supply working electric power to the control module 200, the switch module 300, the atomizer module 400, the inhalation sensors 501, the indication module 600, and any other modules and components of the electronic cigarette requiring electric power.

Each of the inhalation sensors 501 is configured to output a sensing voltage signal to corresponding one of the unidirectional circuits 502 when the inhalation sensor 501 senses airflow.

Each of the unidirectional circuits 502 is configured to filter the sensing voltage signal received from corresponding one of the inhalation sensors 501 to generate a unidirectional voltage signal, and output the unidirectional voltage signal to the input pin of the control module 200.

The switch module 300 is configured to be turned on under control of the control module 200 when the control module 200 receives the unidirectional voltage signal output from any one of the unidirectional circuits 502, and thereby the switch module 300 electrically connects the atomizer module 400 to the battery 100.

The atomizer module 400 is configured to perform atomizing work when the switch module 300 electrically connects the atomizer module 400 to the battery 100.

The indication module 600 is configured to indicate the case that one or more of the inhalation sensors 501 sense airflow under control of the control module 200.

The control module 200 is configured to control the electronic cigarette to work upon receiving the unidirectional voltage signals outputted from one or more of the unidirectional circuits 502. In particular, the control module 200 controls the switch module 300 to be turned on and thereby to electrically connect the atomizer module 400 to the battery 100, so that the atomizer module 400 can perform atomizer work. Furthermore, the control module 200 controls the indication module 600 to indicate the case that at least one of the inhalation sensors 501 senses airflow under control of the control module 200.

Figure 3:
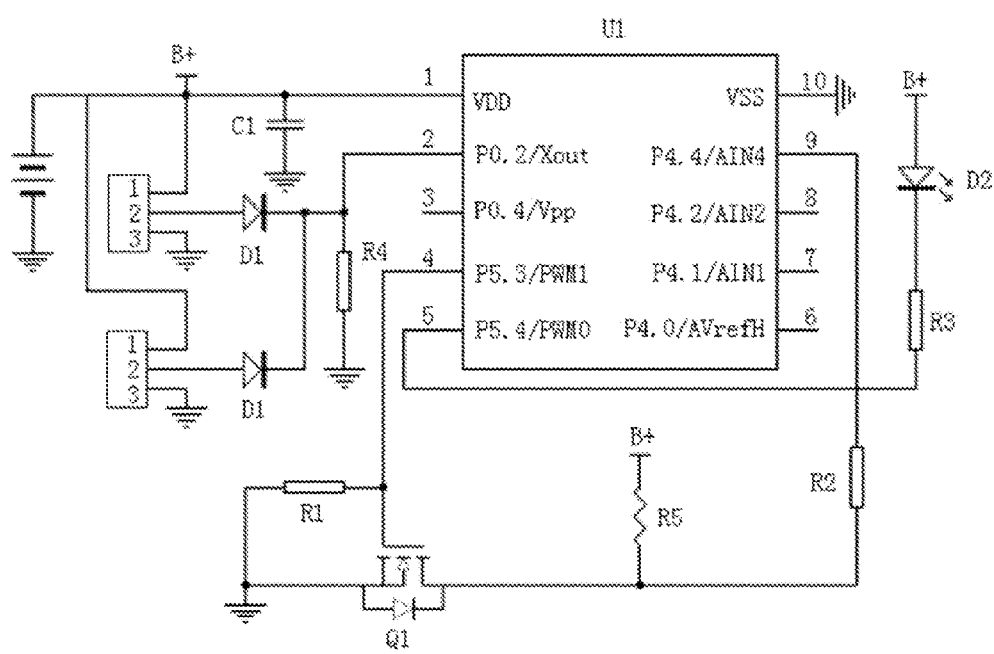
FIG. 3 is a circuit diagram of a multi-sensor control circuit of a first embodiment of the present application.

Referring to FIG. 3, a circuit diagram of a multi-sensor control circuit of a first embodiment of the present application is shown.

According to FIG. 2 and FIG. 3, in the multi-sensor control circuit of the first embodiment of the present application, the control module 200 includes a microprocessor U1, and the type of the microprocessor U1 is SN8P2711B. A second pin of the microprocessor U1 acts as the input pin of the control module 200 that is configured to connect to all of the unidirectional circuits 502.

The type of all of the inhalation sensors 501 is S087. Accordingly, each of the inhalation sensors 501 includes a first sensor pin, a second sensor pin, and a third sensor pin. Each of the unidirectional circuits 502 includes a diode D1, and the diode D1 is advantageously a Schottky diode. In this embodiment, the number of the inhalation sensors 501 is two, and the number of the diodes D1 is also two. The multi-sensor control circuit further includes a pull-down resistor R4.

In this embodiment, positive voltage signals outputted by the inhalation sensors 501 are considered as effective sensing voltage signals. Accordingly, the first sensor pin of each of the inhalation sensors 501 is connected to a positive pole of the battery 100, the second sensor pin of each of the inhalation sensors 501 is connected to an anode of the diode D1 of the unidirectional circuit 502 corresponding to the inhalation sensor 501 and acts as an output pin of the inhalation sensor 501, and the third sensor pin of each of the inhalation sensors 501 is grounded. A cathode of the diode D1 of each of the unidirectional circuits 502 is connected to the second pin of the microprocessor U1. Furthermore, the second pin of the microprocessor U1 is connected to the ground via the pull-down resistor R4.

The switch module 300 includes a MOS transistor Q1 and a bias resistor R1. The MOS transistor Q1 is an N-type MOS transistor. In this embodiment, the atomizer module 400 includes a heating wire R5. Moreover, the atomizer module 400 can also be any other circuits that are capable of performing atomizing work. In the mechanical structure, the atomizer module 400 can include an atomizer detachably connected to a battery rod or an atomizer integrally formed with a battery rod.

The gate of the MOS transistor Q1 is connected to a fourth pin of the microprocessor U1, the source of the MOS transistor Q1 is grounded, and the drain of the MOS transistor Q1 is connected to one end of the heating wire R5. The other end of the heating wire R5 is connected to the positive pole of the battery 100. The gate of the MOS transistor Q1 is further connected to the ground via the bias resistor R1, and the drain of the MOS transistor Q1 is further connected to a ninth pin of the microprocessor U1 via a resistor R2.

When any one of the inhalation sensors 501 senses airflow, the second sensor pin of the inhalation sensor 501 outputs a sensing voltage signal. The diode D1 of the unidirectional circuit 502 corresponding to the inhalation sensor 501 filters the sensing voltage signal to generate a positive voltage signal with a preset high electric level, and the positive voltage signal is transmitted to the second pin of the microprocessor U1. When the second pin of the microprocessor U1 receives the positive voltage signal, the microprocessor U1 determines that the electronic cigarette using the multi-sensor control circuit is being smoked because of generating smoking airflow. Accordingly, the microprocessor U1 outputs an atomizing control signal with a preset high electric level from the fourth pin of the microprocessor U1, and the MOS transistor Q1 is turned on by the atomizing control signal. Thus, the heating wire R5 is electrically connected to the battery 100 and can perform atomizing work.

When none of the inhalation sensors 501 senses airflow, since the second pin of the microprocessor U1 is connected to the ground via the pull-down resistor R4, the second pin of the microprocessor U1 receives a voltage signal with a preset low electric level. Accordingly, the microprocessor U1 determines that no smoking airflow is generated, and does not output the atomizing control signal from the fourth pin of the microprocessor U1. The gate of the MOS transistor Q1 is connected to the ground via the bias resistor R1, and the MOS transistor Q1 is turned off. The heating wire R5 is electrically isolated from the battery 100 and stops atomizing work.

Additionally, the indication module 600 includes a light emitting diode D2 and a resistor R3. An anode of the light emitting diode D2 is connected to the positive pole of the battery 100, and a cathode of the light emitting diode D2 is connected to a fifth pin of the microprocessor U1 via the resistor R3. When one of the inhalation sensors 501 senses airflow, the microprocessor U1 outputs an indication control signal with a preset low electric level from the fifth pin. Upon receiving the indication control signal, the light emitting diode D emits light to indicate the case that one or more of the inhalation sensors 501 sense airflow.

Figure 4:
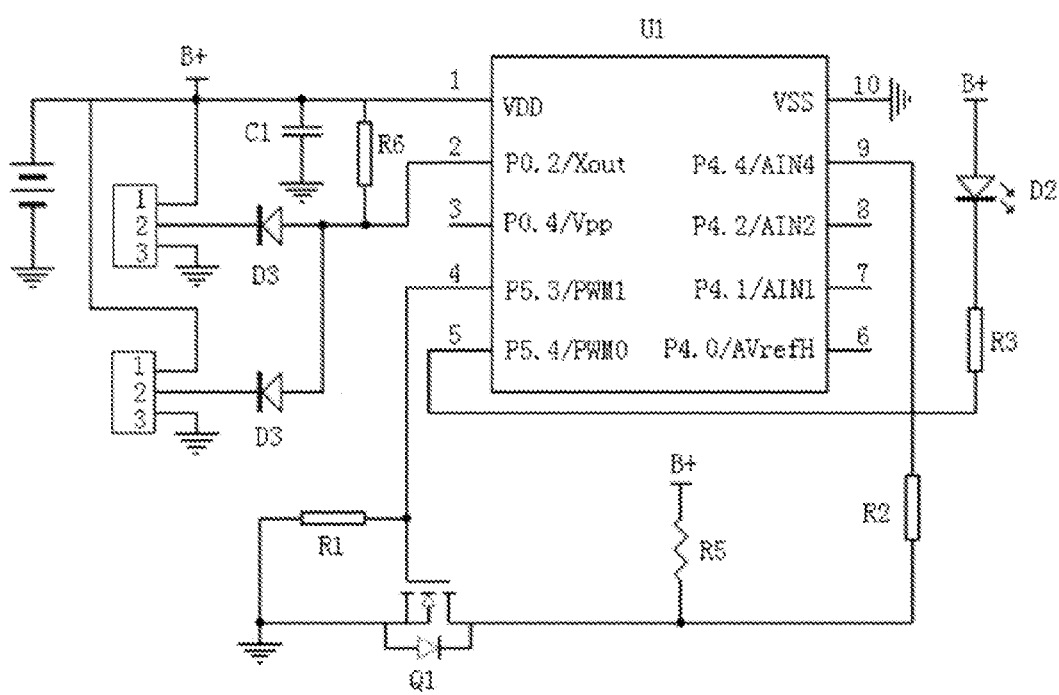
FIG. 4 is a circuit diagram of a multi-sensor control circuit of a second embodiment of the present application.

Referring to FIG. 4, a circuit diagram of a multi-sensor control circuit of a second embodiment of the present application is shown.

The second embodiment differs from the first embodiment in that: in the second embodiment, negative voltage signals outputted by the inhalation sensors 501 are considered as effective sensing voltage signals. Therefore, in the second embodiment, reverse diodes D3 replace the diodes D1 of the unidirectional circuits 502, and a pull-up resistor R6 replaces the pull-down resistor R4.

In particular, the first sensor pin of each of the inhalation sensors 501 is connected to a positive pole of the battery 100, the second sensor pin of each of the inhalation sensors 501 is connected to a cathode of the diode D3 of the unidirectional circuit 502 corresponding to the inhalation sensor 501 and acts as an output terminal of the inhalation sensor 501, and the third sensor pin of each of the inhalation sensors 501 is grounded. An anode of the diode D3 of each of the unidirectional circuits 502 is connected to the second pin of the microprocessor U1. Furthermore, the second pin of the microprocessor U1 is connected to the positive pole of the battery 100 via the pull-up resistor R6.

When any one of the inhalation sensors 501 senses airflow, the second sensor pin of the inhalation sensor 501 outputs a sensing voltage signal. The diode D3 of the unidirectional circuit 502 corresponding to the inhalation sensor 501 filters the sensing voltage signal to generate a negative voltage signal with a preset low electric level, and the negative voltage signal is transmitted to the second pin of the microprocessor U1. When the second pin of the microprocessor U1 receives the negative voltage signal, the microprocessor U1 determines that the electronic cigarette using the multi-sensor control circuit is being smoked because of generating smoking airflow. Accordingly, the microprocessor U1 outputs an atomizing control signal with a preset high electric level from the fourth pin of the microprocessor U1, and the MOS transistor Q1 is turned on by the atomizing control signal. Thus, the heating wire R5 is electrically connected to the battery 100 and can perform atomizing work.

When none of the inhalation sensors 501 senses air flow, since the second pin of the microprocessor U1 is connected to the positive pole of the battery 100 via the pull-up resistor R6, the second pin receives a voltage signal with a preset high electric level. Accordingly, the microprocessor U1 determines that no smoking air flow is generated, and does not output the atomizing control signal from the fourth pin. The gate of the MOS transistor Q1 is connected to the ground via the bias resistor R1, and the MOS transistor Q1 is turned off. The heating wire R5 is electrically isolated from the battery 100 and stops atomizing work.

In conclusion, the multi-sensor control circuit of the present application is used in an electronic cigarette and includes a control module 200, at least two inhalation sensors 501, and at least two unidirectional circuits 502 corresponding to the inhalation sensors 501. A sensing voltage signal outputted from each inhalation sensor 501 is filtered by a corresponding unidirectional circuit 502 and thereby becomes a unidirectional voltage signal. Output terminals of the unidirectional circuits 502 are all connected to a same input pin (i.e., the second pin) of the control module 200. Upon receiving a unidirectional voltage signal outputted from any one of the unidirectional circuits 502, the control module 200 controls the electronic cigarette to work. In this way, the failure rate of the electronic cigarette can be decreased. Furthermore, the multi-sensor control circuit of the present application neither requires too complicated hardware nor occupies too much software resource.

While the present invention has been described with the drawings to preferred embodiments which is merely a hint rather than a limit, it will be understood by those skilled in the art that various changes may be made and equivalents may be substituted without departing from the scope of the present invention. But all the changes will be included within the scope of the appended claims.

What is claimed is:

1. A multi-sensor control circuit used in an electronic cigarette, comprising:
    a battery;
    a control module;
    at least two inhalation sensors; and
    at least two unidirectional circuits corresponding to the inhalation sensors;
    wherein an output terminal of each of the inhalation sensors is connected to an input terminal of corresponding one of the unidirectional circuits, and output terminals of the unidirectional circuits are all connected to a same input pin of the control module;
    the battery is connected to the control module and each of the inhalation sensors;
    each of the inhalation sensors is configured to output a sensing voltage signal to the corresponding one of the unidirectional circuits when the inhalation sensor senses airflow;
    each of the unidirectional circuits is configured to filter the sensing voltage signal received from corresponding one of the inhalation sensors to generate a unidirectional voltage signal, and output the unidirectional voltage signal to the input pin of the control module;
    the control module is configured to control the electronic cigarette to work upon receiving one or more of the unidirectional voltage signals outputted from one or more of the unidirectional circuits;
    each of the unidirectional circuits includes a diode, and the multi-sensor control circuit further include a pull-down resistor;
    an anode of the diode of each of the unidirectional circuits is connected to one of the inhalation sensors corresponding to the unidirectional circuit, and a cathode of the diode of each of the unidirectional circuits is connected to one end of the pull-down resistor and the input pin of the control module; the other end of the pull-down resistor is grounded.

2. The multi-sensor control circuit according to claim 1, wherein the diode of each of the unidirectional circuits is a Schottky diode.

3. The multi-sensor control circuit according to claim 1, wherein each of the inhalation sensors includes a first sensor pin, a second sensor pin, and a third sensor pin; the first sensor pin is connected to a positive pole of the battery, the second sensor pin is connected to the input pin of the control module via the unidirectional circuit corresponding to the inhalation sensor, and the third sensor pin is grounded.

4. The multi-sensor control circuit according to claim 1, wherein the control module includes a microprocessor; the type of the microprocessor is SN8P2711B, and a second pin of the microprocessor acts as the input pin of the control module.

5. The multi-sensor control circuit according to claim 1, wherein the multi-sensor control circuit further includes a switch module and an atomizer module;
    the atomizer module is connected to the battery via the switch module, and the switch module is further connected to the control module;
    the switch module is configured to be turned on under control of the control module when the control module receives an unidirectional voltage signal outputted from any one of the unidirectional circuits, thereby the switch module electrically connects the atomizer module to the battery;
    the atomizer module is configured to perform atomizing work when the switch module electrically connects the atomizer module to the battery.

6. The multi-sensor control circuit according to claim 5, wherein the switch module includes a MOS transistor and a bias resistor;
    the gate of the MOS transistor is connected to the control module, the source of the MOS transistor is grounded, the drain of the MOS transistor is connected to the atomizer module, and the gate of the MOS transistor is further connected to the ground via the bias resistor.

7. The multi-sensor control circuit according to claim 1, wherein the multi-sensor control circuit further includes an indication module;
    the indication module is connected to the battery and the control module respectively, and is configured to indicate the case that one or more of the inhalation sensors sense airflow under control of the control module.

8. The multi-sensor control circuit according to claim 7, wherein, the indication module includes a light emitting diode.

9. A multi-sensor control circuit used in an electronic cigarette, comprising:
    a battery;
    a control module;
    at least two inhalation sensors; and
    at least two unidirectional circuits corresponding to the inhalation sensors;
    wherein an output terminal of each of the inhalation sensors is connected to an input terminal of corresponding one of the unidirectional circuits, and output terminals of the unidirectional circuits are all connected to a same input pin of the control module;

the battery is connected to the control module and each of the inhalation sensors;

each of the inhalation sensors is configured to output a sensing voltage signal to the corresponding one of the unidirectional circuits when the inhalation sensor senses airflow;

each of the unidirectional circuits is configured to filter the sensing voltage signal received from corresponding one of the inhalation sensors to generate a unidirectional voltage signal, and output the unidirectional voltage signal to the input pin of the control module;

the control module is configured to control the electronic cigarette to work upon receiving one or more of the unidirectional voltage signals outputted from one or more of the unidirectional circuits;

each of the unidirectional circuit further includes a diode, and the multi-sensor control circuit further include a pull-up resistor;

a cathode of the diode of each of the unidirectional circuits is connected to one of the inhalation sensors corresponding to the unidirectional circuit, and an anode of the diode of each of the unidirectional circuits is connected to one end of the pull-up resistor and the input pin of the control module; the other end of the pull-up resistor is connected to a positive pole of the battery.

10. The multi-sensor control circuit according to claim 9, wherein each of the inhalation sensors includes a first sensor pin, a second sensor pin, and a third sensor pin; the first sensor pin is connected to a positive pole of the battery, the second sensor pin is connected to the input pin of the control module via the unidirectional circuit corresponding to the inhalation sensor, and the third sensor pin is grounded.

11. The multi-sensor control circuit according to claim 9, wherein the control module includes a microprocessor; the type of the microprocessor is SN8P2711B, and a second pin of the microprocessor acts as the input pin of the control module.

12. The multi-sensor control circuit according to claim 9, wherein the multi-sensor control circuit further includes a switch module and an atomizer module;

the atomizer module is connected to the battery via the switch module, and the switch module is further connected to the control module;

the switch module is configured to be turned on under control of the control module when the control module receives an unidirectional voltage signal outputted from any one of the unidirectional circuits, thereby the switch module electrically connects the atomizer module to the battery;

the atomizer module is configured to perform atomizing work when the switch module electrically connects the atomizer module to the battery.

13. The multi-sensor control circuit according to claim 12, wherein the switch module includes a MOS transistor and a bias resistor;

the gate of the MOS transistor is connected to the control module, the source of the MOS transistor is grounded, the drain of the MOS transistor is connected to the atomizer module, and the gate of the MOS transistor is further connected to the ground via the bias resistor.

14. The multi-sensor control circuit according to claim 9, wherein the multi-sensor control circuit further includes an indication module;

the indication module is connected to the battery and the control module respectively, and is configured to indicate the case that one or more of the inhalation sensors sense airflow under control of the control module.

15. The multi-sensor control circuit according to claim 14, wherein, the indication module includes a light emitting diode.

* * * * *